UNITED STATES PATENT OFFICE.

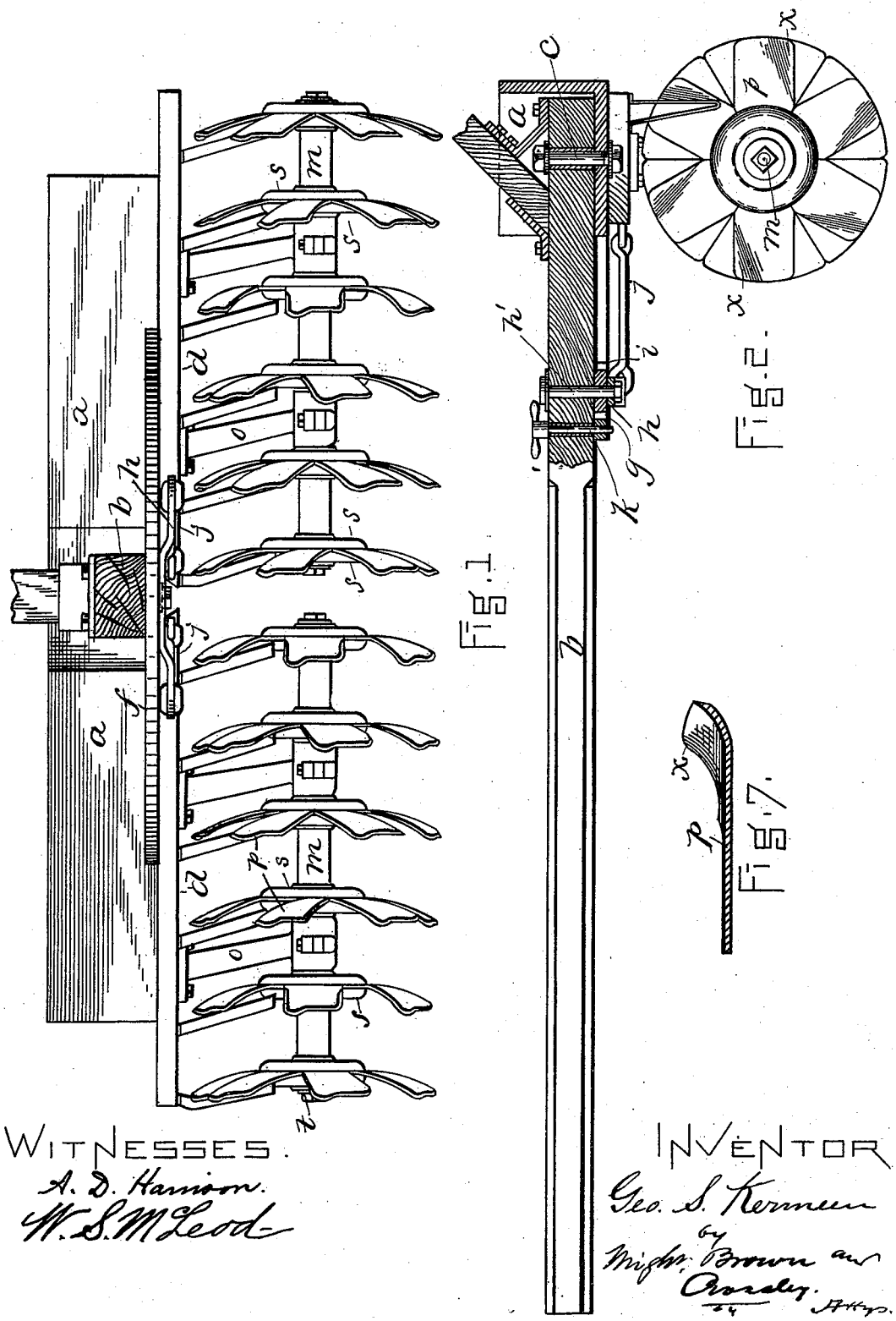

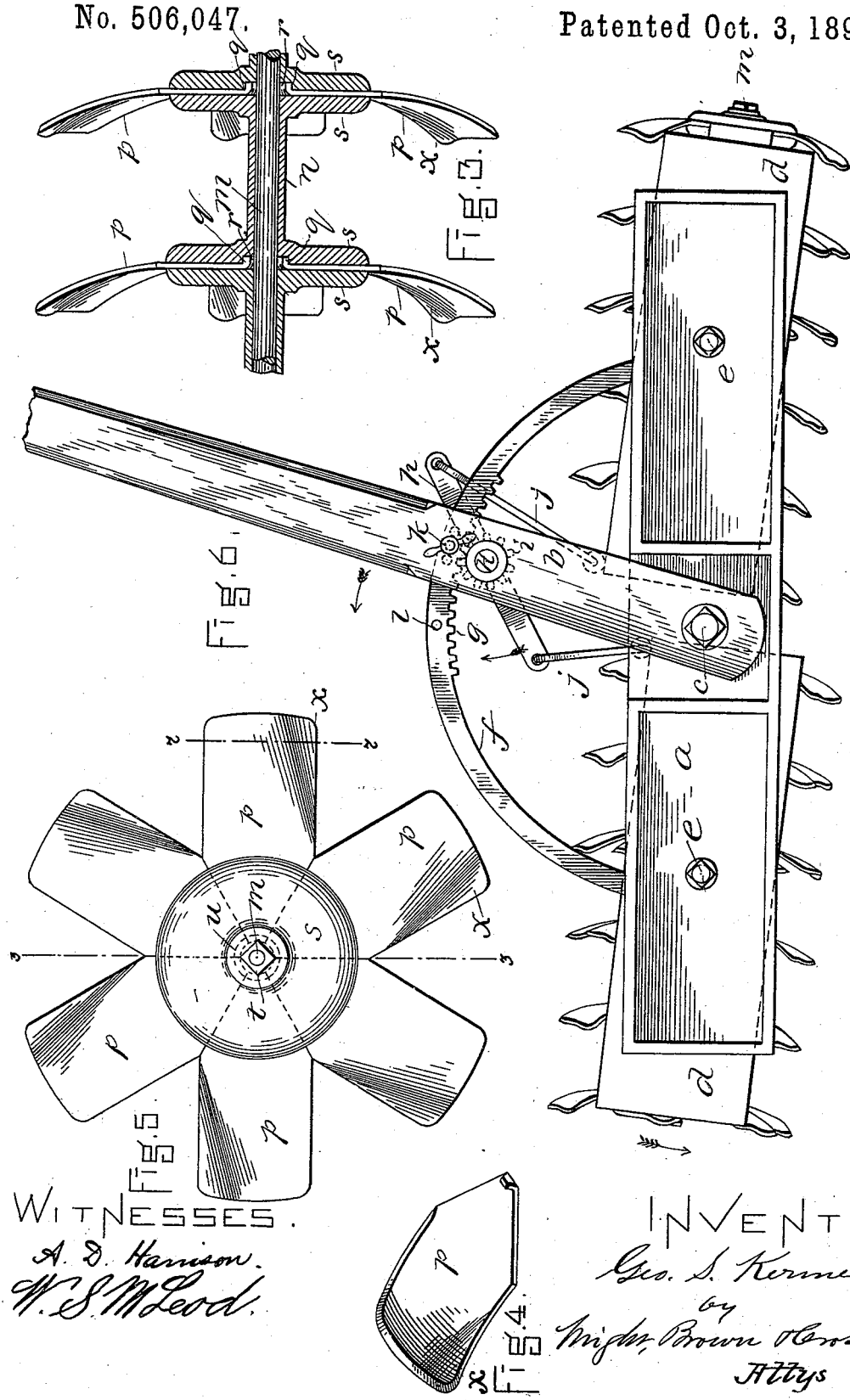

GEORGE S. KERMEEN, OF BOSTON, MASSACHUSETTS, ASSIGNOR OF TWO-THIRDS TO JAMES A. SMITH AND FLORENTINE V. PUFFER, OF SAME PLACE.

DISK HARROW.

SPECIFICATION forming part of Letters Patent No. 506,047, dated October 3, 1893.

Application filed December 5, 1892. Serial No. 454,201. (No model.)

*To all whom it may concern:*

Be it known that I, GEORGE S. KERMEEN, of Boston, in the county of Suffolk and State of Massachusetts, have invented certain new and useful Improvements in Disk Harrows, of which the following is a specification.

My invention relates to that class of wheel or disk harrows in which gangs of soil-working disks are arranged to operate at an angle to the line of draft.

The prime object of the invention is to provide in a harrow of the kind mentioned, soil-working devices so constructed and arranged as that the soil may be thoroughly and evenly worked to the full width of the harrow, and form a smooth seed-bed, free from ridges, hollows, and uncut or unworked streaks and patches.

It is also the object of the invention to provide such improvements in disks or wheels for harrows as will render the same more efficient than heretofore, and at the same time make comparatively easy and inexpensive their construction and repair.

It is also the object of my invention to provide improvements in the means for adjusting the draft-pole with respect to the line or position of the gangs or disks or soil-working wheels, whereby the objectionable end thrust or lateral pressure usually experienced with wheel harrows of common construction is obviated, and the draft of the harrow rendered much lighter.

To these ends the invention consists in the construction and combination of parts as hereinafter described and claimed.

Reference is to be had to the annexed drawings and to the letters marked thereon, forming a part of this specification, the same letters designating the same parts or features, as the case may be, wherever they occur.

Of the drawings—Figure 1, is a front view of my improved harrow, the draft-pole being shown in section. Fig. 2, is a vertical central sectional view, the gangs of disks being represented in elevation and adjusted in the same line. Fig. 3, is a sectional view taken on the line 3 3 of Fig. 5, of two disks, their hubs, and the axle. Fig. 4, is a perspective view of one of the blades of a disk, detached. Fig. 5, is an end view of the end disk of a gang of disks. Fig. 6, is a top plan view of the improved harrow. Fig. 7, is a sectional detail view taken on the line 7, 7 of Fig. 5, and drawn to an enlarged scale.

In the drawings $a$ designates the frame which may consist of a cross-beam, as shown, or any other suitable means, to which is attached a draft-pole $b$ by means of a king-bolt $c$, so that the pole may turn on the said king-bolt, as a pivot.

$d\ d$ designate planks or plates, connected with the frame-beam $a$ by means of bolts $e\ e$, so that each plank or plate may turn on its respective bolt as a pivot.

$f$ designates a segmental bar connected at its end with the frame beam $a$, and provided on its inner edge at the central portion with teeth $g$.

$h$ is a lever fulcrumed at $h'$ on the draft pole, and having a pinion $i$ rigidly secured thereto, which pinion engages the teeth $g$ of the segmental bar $f$.

$j\ j$ designate link rods pivotally connected at their forward ends with the ends of the lever $h$, and attached in like manner at their rearward ends with the inner ends of the planks or plates $d$, so that as the draft pole is swung on the king bolt $c$, to the right or left, the planks $d$ may be moved on their bolts $e$ and maintained in a position other than at right angle to the draft pole, and at varying angles with respect to the frame-beam $a$. A pin or bolt $k$ passing through a hole in the draft pole, and one of a series of holes $l$ formed in or through the segmental bar $f$ may be provided for maintaining the parts in their desired position of adjustment.

$m\ m$ designate the axles of the gangs of disks or wheels, which axles are supported in sleeve bearings $n$ by means of suitable standards $o$ connected with the said bearings and the planks or plates $d$. Each disk or wheel is made up of a plurality of blades $p$, the inner ends of which are bent at substantially a right angle to the main or body portion, so as to form shoulders $q$ which are adapted to engage a groove or offset $r$ formed at or near the center of one of a pair of clamping disks *s s* which constitute the hub of each wheel or disk. The said angular ends may or may not be constructed so as to bear upon the axle. The edges of each blade *q* from their inner ends or shoulders outwardly to substantially the edges of clamping disks *s* are radial with respect to the center of said clamping disks, so that the edges of each disk at its base will be borne against by the opposing edges of the adjacent disks, and so that the bases of the several blades making up each soil-working disk will completely cover the inner surfaces of the hub clamping disks *s s*, and the base of each blade will serve as a brace to the others. The bearings *n* for the axles may be made separate from the clamping disks *s*, or they may be made as herein shown, wherein they are represented as being integrally connected with opposing clamping disks of adjacent wheels, the said clamping disks and sleeves being maintained on the axles by means of nuts *t* and washers *u* thereon, or by other suitable devices. The forward or entering or cutting edge of each blade extends substantially in the plane of the body of the blade, while the lower or outer portion of the rearward or trailing part and edge is re-entrant, or curved inward toward the earth-working face of the blade, so as to form a curved lip, *x* which will tend to turn over and agitate the soil as the rearward or trailing edge of the blade rises out of and leaves the ground, it being understood that the forward edge of the blade will enter the soil substantially "edge on."

Heretofore, in the most commonly used form of harrows employing gangs of disks, the gangs have been equipped with disks which, from their arrangement, are termed "rights" and "lefts," which throw the earth to the right and left—to or from the center—accordingly as they are arranged. In case these right and left gangs are arranged to throw outward or from the center, a space or strip of soil is left uncut or unworked, and to work out such space or strip the harrow must be driven at half laps which amounts to going over the same ground twice half the width of the harrow, and which occasions considerable loss of time. There are however, in the prior art quite a number of attachments to right and left gang harrows, for the purpose of operating upon the unworked space or strip of soil between the inner end disk of each gang, such as dragging spike teeth, and curved spring teeth, sprocket wheels or disks and trailing disks, in the rear of the gangs, but which do not fully accomplish the desired end. When disk harrows with "right" and "left" gangs of disks or wheels are arranged for throwing the earth toward the center the inner end disks cause a ridge or force the earth above the desired level at the center of the harrow. By my invention in which the gangs of disks are arranged to throw the soil in one direction only, the before-mentioned objections are overcome, and no ridges are formed or unworked streaks or strips are left, so that the soil is completely worked or agitated and evened to form a perfect seed-bed by the disks in the gangs alone, to the full width of the harrow, and going over the ground a second time is unnecessary. I am therefore enabled by my improved harrow to treat a given amount of ground surface, in less time, under the same circumstances, than can be accomplished with right and left gangs of disks, as heretofore usually employed.

I am aware of Patent No. 304,010 to La Dow, and do not claim anything disclosed therein.

In disk harrows equipped with gangs throwing the earth right and left, as described, there is a material degree of end-thrust, or side-pressure, which occasions heavy draft, and in hard or baked land, prevents the disks from entering at an even depth the full width of the harrow.

In the construction of my harrow the gangs are so pivoted to the frame beam *a* and connected with the lever *h*, as that when the draft pole extends directly forward in a line at right angles to the frame beam, the gangs will be under the frame beam, and parallel therewith; but by reason of the gang planks *d* being pivoted off their longitudinal centers, when the draft pole is moved to the right or left from a right-angle position with respect to the frame beam, the position of the gangs will vary as to angularity with the line of the draft pole and, consequently the line of draft. By this means the working faces of the disks are rendered adjustable with regard to the line of draft; and it is owing to the peculiar adjustment of the gangs of disks, as explained and to the form of the disks themselves that the end thrust or side pressure is practically overcome or done away with, whereby the draft of the harrow is made much lighter than in harrows employing right and left gangs. As soon as the draft pole is adjusted away from a position at a right angle to the frame beam, the planks *d* and the axles *m* of the disks assume a position, which, relatively to the draft pole is acute on one side and obtuse on the other, while the two gangs still remain parallel with each other. Thus the tendency of the end thrust all in one direction to swing the harrow around, is obviated. And, by the adjustability at different angles, the harrow is accommodated to different qualities of soil, since a hard soil would have more tendency to cause a lateral movement than a softer soil.

Referring to Fig. 6, it will readily be understood that in operation there will be a tendency of the disk gangs to move slightly to the right of a line drawn at a right angle to the said gangs; therefore the draft pole is adjusted slightly to the right of such line.

By forming my soil-working disks as herein shown and described, any one of the blades can be readily removed in case of breakage or dullness, so that it can be taken out and repaired, or sharpened, without disturbing the other blades of the disk, and this can be done without breaking or loosening rivets, or removing nuts and bolts or other like devices, as is the case with other forms of bladed disks, the blades in my disks being firmly held without bolts or rivets passing through the blades.

I find that riveted or bolted bladed disks are very liable to clog in soft dirt and among weeds and vines, by reason of the earth and vegetable substance catching on the said bolts and rivets, and this clogging prevents the blades from having their full effect on the soil, and increases the draft materially. My device makes a smooth earth working surface and lessens greatly the liability of clogging and attendant friction.

By the use of a re-entrant lip the blades can be made with less curve or "dish" and the straighter edges of the blades enter deeper and easier while the re-entrant lips lift and loosen the soil as thoroughly as concaved disks, and the side pressure is lessened.

In moist land the work is performed by my improved disks with less clogging than with concavo-convex disks or bladed disks with cutting shoulders at angles.

Having thus explained the nature of the invention and described a way of constructing and using the same, though without attempting to set forth all of the forms in which it may be made or all of the modes of its use, it is declared that what is claimed is—

1. A disk harrow, comprising in its construction a plurality of gangs of disks all arranged to throw the soil in the same direction, said gangs being pivoted to the frame off their longitudinal centers, an adjustable draft pole, a lever fulcrumed on the draft pole, and a link rod at each end of said lever and extending therefrom to the disk gangs, substantially as described.

2. A disk harrow comprising in its construction, the cross beam $a$, the draft pole $b$ pivoted thereto, two gangs of disks all arranged to throw the soil in the same direction and pivoted to the beam $a$ each side of the draft pole, the segmental bar $f$ having teeth $g$, the lever $h$ pivoted to the draft pole and having pinion $i$ engaging the teeth $g$, and link rods $j\,j$ connecting the said lever with the inner ends of the disk gangs, substantially as described.

3. A wheel or disk for disk harrows, comprising in its construction a clamping hub, and a plurality of independently removable blades curved from the hub to their ends the forward or cutting edge of each blade extending in a plane with the body, and the lower or outer portion of the rearward or trailing part being re-entrant or curved inward toward the earth-work face, as described.

4. A wheel or disk for disk harrows, comprising in its construction a plurality of independently removable blades, a two-part hub between which the inner ends or bases of the blades are held, the edges of each blade from its inner end outward to substantially the edge of the hub bearing against the opposing edges of the bases of the adjacent blades, as described.

In testimony whereof I have signed my name to this specification, in the presence of two subscribing witnesses, this 16th day of November, A. D. 1892.

GEORGE S. KERMEEN.

Witnesses:
ARTHUR W. CROSSLEY,
F. M. WHIPPLE.